United States Patent
Youn et al.

(10) Patent No.: US 8,257,812 B2
(45) Date of Patent: Sep. 4, 2012

(54) LOW-NOISE PLASTIC INTERCOOLER PIPE HAVING MULTI-LAYERED STRUCTURE

(75) Inventors: Jee Young Youn, Incheon (KR); Min Ho Choi, Gyeonggi-do (KR); Bong Hyun Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 158 days.

(21) Appl. No.: 12/793,853

(22) Filed: Jun. 4, 2010

(65) Prior Publication Data

US 2011/0120584 A1 May 26, 2011

(30) Foreign Application Priority Data

Nov. 26, 2009 (KR) .................. 10-2009-0115096

(51) Int. Cl.
*B29D 22/00* (2006.01)
(52) U.S. Cl. ............... 428/36.91; 428/36.4; 428/34.7; 138/137
(58) Field of Classification Search ............... 428/36.91, 428/34.7, 36.4; 138/140, 137, 141
See application file for complete search history.

(56) References Cited

U.S. PATENT DOCUMENTS

| 3,850,881 A | * | 11/1974 | Hoeschele | 524/204 |
| 4,096,126 A | * | 6/1978 | Tanaka et al. | 528/305 |
| 4,367,316 A | * | 1/1983 | Tanaka et al. | 525/173 |
| 4,528,346 A | * | 7/1985 | Sugie et al. | 525/523 |
| 5,091,478 A | | 2/1992 | Saltman | 525/179 |
| 5,106,892 A | * | 4/1992 | Chiolle et al. | 524/120 |
| 5,236,979 A | * | 8/1993 | Chiolle et al. | 524/120 |
| 6,294,234 B1 | * | 9/2001 | Kertesz | 428/34.7 |
| 7,976,749 B2 | * | 7/2011 | Volkel et al. | 264/45.6 |
| 2002/0144744 A1 | * | 10/2002 | Kertesz | 138/137 |
| 2008/0292864 A1 | * | 11/2008 | Volkel et al. | 428/305.5 |
| 2011/0120584 A1 | * | 5/2011 | Youn et al. | 138/140 |

FOREIGN PATENT DOCUMENTS

| JP | 06-238843 A | 8/1994 |
| JP | 2002-089755 A | 3/2002 |
| JP | 2006-316262 A | 11/2006 |
| KR | 10-2003-0095676 | 12/2003 |
| KR | 10-2005-0054810 A | 6/2005 |
| KR | 10-2005-0111986 | 11/2005 |
| KR | 10-2007-0102027 | 10/2007 |
| KR | 10-2009-0074402 A | 7/2009 |

* cited by examiner

*Primary Examiner* — N. Edwards
(74) *Attorney, Agent, or Firm* — Edwards Wildman Palmer LLP; Peter F. Corless

(57) ABSTRACT

The present invention provides a low-noise plastic intercooler pipe. In preferred embodiments, the present invention preferably provides a low-noise plastic intercooler pipe having a multi-layered structure including: a skin layer including a thermoplastic etherester elastomer (TEEE) and a soundproof core layer including glass bubbles.

13 Claims, 1 Drawing Sheet

LOW-NOISE PLASTIC INTERCOOLER PIPE HAVING MULTI-LAYERED STRUCTURE

CROSS-REFERENCE TO RELATED APPLICATION

This application claims under 35 U.S.C. §119(a) the benefit of Korean Patent Application No. 10-2009-0115096 filed Nov. 26, 2009, the entire contents of which are incorporated herein by reference.

BACKGROUND OF THE INVENTION

1. Field of the Invention

The present invention relates, generally, to a low-noise plastic intercooler pipe having a multi-layered structure including: a skin layer preferably including a thermoplastic etherester elastomer and a soundproof core layer preferably including glass bubbles.

2. Description of the Related Art

Typically, an intercooler pipe, as a pipe connecting a turbocharger and an intercooler, functions as a channel transporting air discharged from the turbocharger to the intercooler. Unburned gas from an engine becomes high-temperature and high-pressure gas while passing through the turbocharger, and the high-temperature and high-pressure gas is resupplied to a combustion chamber of the engine via the intercooler and an air intake manifold.

Conventional intercooler pipes for an automobile are generally formed of metal such as aluminum, or a metal pipe. For example, an aluminum pipe connected to a rubber hose has been described. However, since the metal intercooler pipe is heavy, weight reduction that is preferably in demand in the automotive industry is difficult to accomplish. Furthermore, a variety of processes, such as an injection molding of the rubber hose, a pultrusion molding and bending of the aluminum pipe, and a clamping process connecting the rubber hose to the aluminum pipe are required, and thus costs for manufacturing the metal intercooler pipe suitably increase.

Recently, a technique of manufacturing a plastic intercooler pipe using thermoplastic etherester elastomer by three-dimensional co-extrusion blow molding has been reported. However, the plastic intercooler pipe has decreased effects of blocking noise, vibration, and harshness (NVH) compared to an aluminum pipe. Preferably, the density of the material that is used to form the intercooler pipe needs to be suitably increased to reduce aerodynamic noise, or the thickness of the intercooler pipe needs to be increased to reduce noise. In addition, the weight of the intercooler pipe and manufacturing costs suitably increase, and it is difficult to assemble the intercooler pipe into an automobile due to high flexural modulus.

Accordingly, there is a need in the art for a low-noise intercooler pipe.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention features a plastic intercooler pipe having a multi-layered structure including a skin layer and a soundproof core layer having blowholes caused by glass bubbles. The present invention also features a composition of the soundproof core layer having excellent soundproof effects. In preferred embodiments, the present invention provides a low-noise plastic intercooler pipe having a multi-layered structure.

According to preferred embodiments of the present invention, there is provided a low-noise plastic intercooler pipe having a multi-layered structure including a skin layer having a thermoplastic etherester elastomer (TEEE); and a soundproof core layer having the TEEE, glass bubbles, and a heat stabilizer.

The low-noise plastic intercooler pipe having a multi-layered structure according to the present invention has excellent properties that are suitably required for an intercooler pipe of an automobile. In particular preferred embodiments of the present invention, the low-noise plastic intercooler pipe more efficiently blocks aerodynamic noise and structural noise that is generated in the intercooler pipe when compared to conventional plastic intercooler pipes.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features and advantages of the present invention will become more apparent by describing in detail exemplary embodiments thereof with reference to the attached drawings in which.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

As described herein, the present invention includes a low-noise plastic intercooler pipe having a multi-layered structure comprising a skin layer comprising a thermoplastic etherester elastomer; and a soundproof core layer.

In one embodiment, the soundproof core layer comprises the thermoplastic etherester elastomer, glass bubbles, and a heat stabilizer.

In another embodiment, the skin layer and the soundproof core layer are sequentially stacked, and the soundproof core layer is stacked on the skin layer.

In another further embodiment, the skin layer and the soundproof core layer are sequentially stacked to form two- to five-layered structures.

In one embodiment, the thermoplastic etherester elastomer contained in the skin layer and the soundproof core layer is a copolymer prepared by copolymerizing 1,4-butadiene, dimethyl terephthalate, and polytetramethylene glycol, and a block copolymer having a structure in which a polyether soft segment and a polyester hard segment are alternately located.

In another embodiment, the thickness of the skin layer is in the range of 0.5 to 1.5 mm, and the thickness of the soundproof core layer is in the range of 1.5 to 3 mm.

In another further embodiment, the total thickness of the plastic intercooler pipe is in the range of 2 to 5 mm.

In one embodiment, the soundproof core layer comprises 78 to 95 wt % of the thermoplastic etherester elastomer, 4 to 20 wt % of the glass bubbles, and 0.02 to 2 wt % of the heat stabilizer.

In another embodiment, the heat stabilizer comprises at least one selected from the group consisting of: N,N'-hexane-1,6-diyl bis, 2,2'-m-phenylene bis(2-oxazoline) and 4,4'-bis(a,a-dimethylbenzyl-disphenylamine).

In another further embodiment, the plastic intercooler pipe is manufactured using three-dimensional multi-layered blow molding.

The present invention also features an automobile comprising the low-noise plastic intercooler pipe of the aspects described herein.

Hereinafter, the present invention will now be described more fully with reference to the accompanying drawings, in which exemplary embodiments of the invention are shown.

In a particular preferred embodiment, a low-noise plastic intercooler pipe having a multi-layered structure according to the present invention includes: a skin layer having a thermoplastic etherester elastomer (TEEE); and a soundproof core layer having the TEEE, glass bubbles, and a heat stabilizer.

Figure 1:
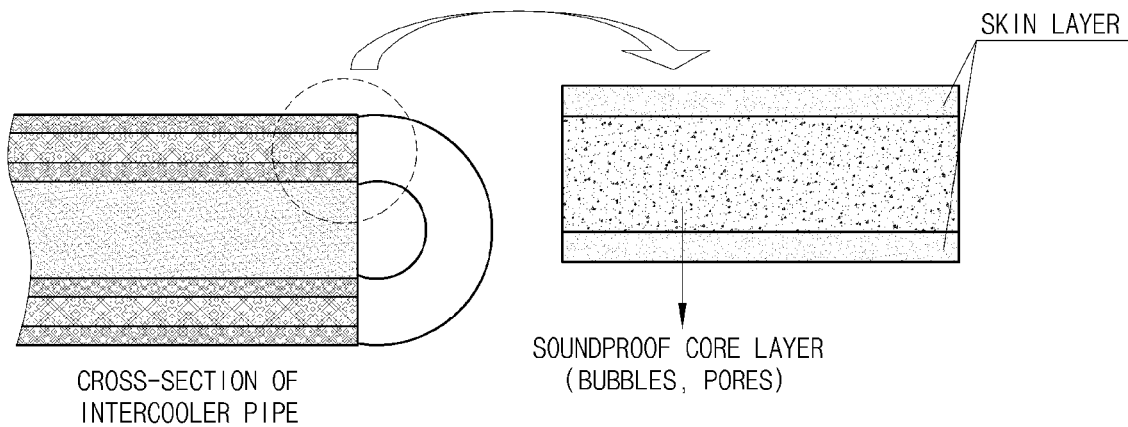
FIG. 1 shows a cross-sectional view of a plastic-intercooler pipe having a three-layered structure according to an embodiment of the present invention.

Preferably, the low-noise plastic intercooler pipe according to exemplary embodiments may have a structure in which the skin layer and the soundproof core layer are suitably stacked. In further preferred embodiments, the low-noise plastic intercooler pipe may have a two-layered structure in which a soundproof core layer is suitably stacked on a skin layer, a three-layered structure in which a skin layer, a soundproof core layer, and a skin layer are suitably sequentially stacked as shown in FIG. 1, a four-layered structure in which a skin layer, a soundproof core layer, a skin layer, and a soundproof core layer are suitably sequentially stacked, or a five-layered structure in which a skin layer, a soundproof core layer, a skin layer, a soundproof core layer, and a skin layer are suitably sequentially stacked.

In further preferred embodiments, the thickness of the skin layer may be equal to or greater than 0.5 mm, preferably in the range of 0.5 to 1.5 mm, and the thickness of the soundproof core layer may be equal to or greater than 1.5 mm, preferably in the range of 1.5 to 3 mm. In further preferred embodiments, if the thickness of the skin layer is less than 0.5 mm, the skin layer may not have suitably sufficient rigidity. In other preferred embodiments, if the thickness of the skin layer is greater than 1.5 mm, molding property may be suitably deteriorated. In other further embodiments, if the thickness of the soundproof core layer is less than 1.5 mm, sound absorbing property may not be suitably sufficient. On the other hand, if the thickness of the soundproof core layer is greater than 3 mm, molding property may be suitably deteriorated.

Preferably, according to particular exemplary embodiments, the total thickness of the low-noise plastic intercooler pipe having two- to five-layered structures in which the skin layers and the soundproof core layers are stacked may be in the range of 2 to 5 mm. Preferably, if the thickness of the low-noise plastic intercooler pipe is less than 2 mm, durability and sound absorbing property may be suitably deteriorated. In other preferred embodiments, if the thickness of the low-noise plastic intercooler pipe is greater than 5 mm, flexural modulus of the intercooler pipe may be suitably reduced.

According to other preferred embodiments of the present invention, the TEEE contained in the skin layer and the soundproof core layer may be a copolymer prepared by copolymerizing 1,4-butanediol, dimethyl terephthalate, and polytetramethylene ethol glycol, and a block copolymer having a structure in which a polyether soft segment and a polyester hard segment are alternately located. Preferably, the TEEE has better strength maintaining property at high- and low-temperature than thermoplastic polyurethane or thermoplastic polyolefin. Further, the TEEE may have a shore hardness, preferably in the range of 40 to 70 D and a tensile strength in the range of 20 to 40 Mpa to suitably improve pressure resistance of intercooler pipe (max: 2.5 bar) and flexibility for pipe assembling.

According to further preferred embodiments, the soundproof core layer may include 78 to 95 wt % of the TEEE, 4 to 20 wt % of the glass bubbles, and 0.02 to 2 wt % of the heat stabilizer based on the total weight of the soundproof core layer.

Preferably, the glass bubble contained in the soundproof core layer is a three-dimensional micro sphere having a hollow inside. In other further embodiments, according to the present embodiment, a bubble structure or porous structure is preferably provided to the soundproof core layer to absorb sounds. Herein, the glass bubbles are not particularly limited. Preferably, the glass bubbles having an average diameter in the range of 40 to 130 µm, preferably in the range of 80 to 120 µm may be used. In further preferred embodiments, if the average diameter of the glass bubbles is not within the range described above, the sound-absorbing effects may be suitably reduced. Preferably, the amount of the glass bubbles may be in the range of 4 to 20 wt % based on the total weight of the soundproof core layer. In certain particular embodiments, if the amount of the glass bubbles is less than 4 wt %, the effect of reducing noise may not be suitably sufficient. In other certain embodiments, if the amount of the glass bubbles is greater than 20 wt %, mechanical properties of the intercooler pipe may be suitably deteriorated.

According to other further embodiments, the heat stabilizer is preferably contained in the soundproof core layer to suitably improve heat resistance of the intercooler pipe at high temperature. Preferably, the heat stabilizer may include at least one selected from the group consisting of N,N'-hexane-1,6-diyl bis, 2,2'-m-phenylene bis(2-oxazoline) and 4,4'-bis(a,a-dimethylbenzyl-disphenylamine).

In further preferred embodiments, the amount of the heat stabilizer may be in the range of 0.02 to 2 wt % based on the total weight of the soundproof core layer. Preferably, if the amount of the heat stabilizer is less than 0.02 wt %, heat resistance may not be attained. In other particular embodiments, if the amount of the heat stabilizer is greater than 2 wt %, the heat stabilizer may leak to the surface of the product.

In still other preferred embodiments, the low-noise plastic intercooler pipe may be manufactured using three-dimensional multi-layered blow molding, but the manufacturing method is not limited thereto.

Hereinafter, one or more embodiments will be described in detail with reference to the following examples. However, these examples are not intended to limit the purpose and scope of the invention

EXAMPLES

Example 1

In a first example, TEEE prepared by copolymerizing 1,4-butanediol, dimethyl terephthalate, and polytetramethylene ethol glycol and having a shore hardness of 55 D and a tensile strength of 30 (DuPont, Hytrel 4275) was used to form a skin layer. TEEE that was used to form the skin layer, glass bubbles having an average diameter of 100 μm, and a heat stabilizer including N,N'-hexane-1,6-diylbis, 2,2'-m-phenylene bis(2-oxazoline) and 4,4'-bis(a,a-dimethylbenzyl-disphenylamine) as listed in Table 1 below were used to form a soundproof core layer. Then, a low-noise plastic intercooler pipe (having a diameter of 50 mm) having a two-layered structure including a skin layer (inner layer having a thickness of 1 μm) and a soundproof core layer (outer layer having a thickness of 3 μm) which were formed using the materials described above was manufactured using blow molding.

Examples 2 to 3

In another set of examples, a low-noise plastic intercooler pipe having a three-layered structure in which a skin layer (having a thickness of 0.5 μm), a soundproof core layer (having a thickness of 3 μm), and a skin layer (having a thickness of 0.5 μm) were sequentially stacked was manufactured in the same manner as in Example 1 (Example 2). A low-noise plastic intercooler pipe having a four-layered structure in which a skin layer (having a thickness of 0.5 μm), a soundproof core layer (having a thickness of 2 μm), a skin layer (having a thickness of 0.5 μm), and a soundproof core layer (having a thickness of 2 μm), were sequentially stacked was manufactured in the same manner as in Example 1 (Example 3).

Comparative Example 1

A single-layer plastic intercooler pipe having a thickness of 3 mm was manufactured using TEEE having a shore hardness of 50 D and a tensile strength of 30 (DuPont, Hytrel 4275) by three-dimensional multi-layered blow molding.

Comparative Example 2

A plastic intercooler pipe (having a diameter of 50 mm) having a three-layered structure was manufactured in the same manner as in Example 2, except that the soundproof core layer had the composition as described in Table 1 below.

TABLE 1

| wt % | | Example 1 | Example 2 | Example 3 | Comparative Example 2 |
|---|---|---|---|---|---|
| TEEE | | 89.1 | 89.1 | 89.1 | 99.1 |
| Glass bubble[1] | | 10 | 10 | 10 | — |
| Heat stabilizer | A[2] | 0.5 | 0.5 | 0.5 | 0.5 |
| | B[3] | 0.2 | 0.2 | 0.2 | 0.2 |
| | C[4] | 0.2 | 0.2 | 0.2 | 0.2 |

[1]glass bubbles: average diameter: 100 μm, S60 (3M).
[2]A: N,N'-hexane-1,6-diyl bis
[3]B: 2,2'-m-phenylene bis(2-oxazoline)
[4]C: 4,4'-bis(a,a-dimethylbenzyl-disphenylamine)

Experimental Example 1

Measurement of Physical Properties

The layers of the low-noise plastic intercooler pipe manufactured according to Example 1 was cut into pieces suitable for tests as described in Table 2 below and physical properties thereof were measured using methods of Table 2. The results are shown in Table 2.

TABLE 2

| | Test method | Unit | Skin layer | Soundproof core layer | Properties required for plastic intercooler pipe |
|---|---|---|---|---|---|
| Tensile strength | ISO 527 | MPa | 30 | 28 | 25 or greater |
| Flexural modulus | ISO 178 | Mpa | 170 | 174 | 160 or greater |
| Specific gravity | ISO 1183 | g/cm$^3$ | 1.16 | 1.05 | — |
| Glass transition temperature | ISO 75f | °C. | 50 | 52 | 45 or greater |

Experimental Example 2

Noise Test

Figure 2:
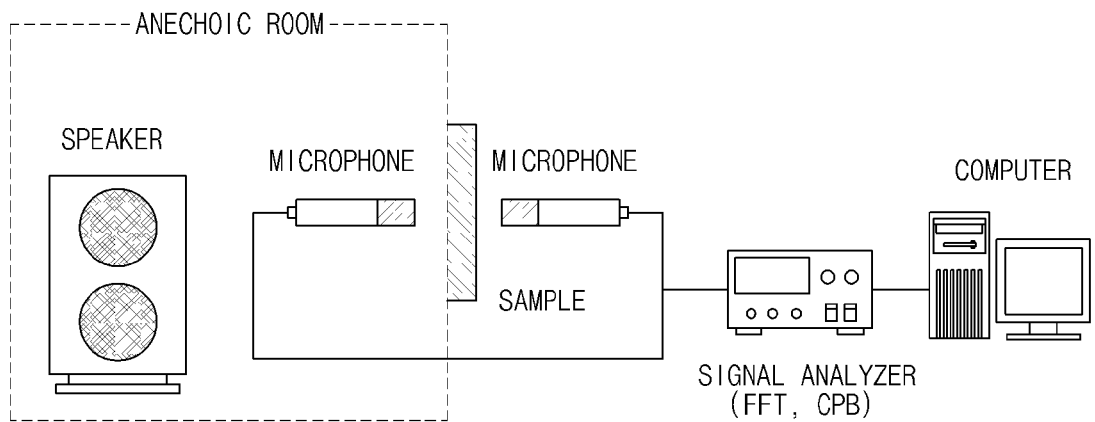
FIG. 2 shows a system for a noise test performed in Experimental Example 2.

As shown in FIG. 2, a noise was generated through a speaker in an anechoic room and passed through the plastic intercooler pipes manufactured according to Examples 1 to 3 and Comparative Examples 1 and 2. The noise that has passed through the plastic intercooler pipes was measured using a microphone, and the results are shown in Table 3 below.

TABLE 3

| | Overall Noise Level | | |
|---|---|---|---|
| | 0~1,000 Hz | 1,000~4,000 Hz | 4,000~8,000 Hz |
| Example 1 | 61.2 dB | 50.1 dB | 41.5 dB |
| Example 2 | 60.5 dB | 49.5 dB | 41.0 dB |
| Example 3 | 60.2 dB | 49.9 dB | 40.1 dB |
| Comparative Example 1 | 61.5 dB | 53.8 dB | 45.3 dB |
| Comparative Example 2 | 61.3 dB | 53.5 dB | 45.0 dB |

Referring to Table 3, upon comparing the results of the conventional plastic intercooler pipe manufactured according to Comparative Example 1 with those of the plastic intercooler pipes manufactured according to Examples 1 to 3, the noises were similar at a frequency in the range of 0 to 1,000 Hz. At a frequency of 1000 Hz or greater, the noises from the intercooler pipe according to Examples 1 to 3 were lower than the noise from the intercooler pipe according to Comparative Example 1 (100) by about 7 to 12%. The noise from the plastic intercooler pipe having the three-layered structure manufactured without using glass bubbles according to Comparative Example 2 was slightly lower than the intercooler pipe manufactured according to Comparative Example 1, but higher than the intercooler pipes manufactured according to Examples 1 to 3. Therefore, it was identified that noise blocking effect (sound absorbing effect) was improved using glass bubbles.

Preferably, the plastic intercooler pipe having the multi-layered structure may be efficiently applied to an intercooler pipe for an automobile.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A low-noise plastic intercooler pipe having a multilayered structure comprising:
   a skin layer comprising a thermoplastic etherester elastomer; and
   a soundproof core layer stacked adjacent to the skin layer to form the multilayered structure, the soundproof layer comprising the thermoplastic etherester elastomer, glass bubbles, and a heat stabilizer.

2. The low-noise plastic intercooler pipe of claim 1, wherein the skin layer and the soundproof core layer are sequentially stacked, and the soundproof core layer is stacked on the skin layer.

3. The low-noise plastic intercooler pipe of claim 2, wherein the skin layer and the soundproof core layer are sequentially stacked to form two- to five-layered structures.

4. The low-noise plastic intercooler pipe of claim 1, wherein the thermoplastic etherester elastomer contained in the skin layer and the soundproof core layer is a copolymer prepared by copolymerizing 1,4-butanediol, dimethyl terephthalate, and polytetramethylene ethol glycol, and a block copolymer having a structure in which a polyether soft segment and a polyester hard segment are alternately located.

5. The low-noise plastic intercooler pipe of claim 1, wherein the thickness of the skin layer is in the range of 0.5 to 1.5 mm, and the thickness of the soundproof core layer is in the range of 1.5 to 3 mm.

6. The low-noise plastic intercooler pipe of claim 5, wherein the total thickness of the plastic intercooler pipe is in the range of 2 to 5 mm.

7. The low-noise plastic intercooler pipe of claim 1, wherein the soundproof core layer comprises 78 to 95 wt % of the thermoplastic etherester elastomer, 4 to 20 wt % of the glass bubbles, and 0.02 to 2 wt % of the heat stabilizer.

8. The low-noise plastic intercooler pipe of claim 1, wherein the heat stabilizer comprises at least one selected from the group consisting of: N,N'-hexane-1,6-diyl bis, 2,2'-m-phenylene bis(2-oxazoline) and 4,4'-bis(a,a-dimethylbenzyl-disphenylamine).

9. The low-noise plastic intercooler pipe of claim 1, wherein the plastic intercooler pipe is manufactured using three-dimensional multi-layered blow molding.

10. An automobile comprising the low-noise plastic intercooler pipe of claim 1.

11. A low-noise plastic intercooler pipe having a multilayered structure comprising a skin layer comprising a thermoplastic etherester elastomer; and a soundproof core layer.

12. The low-noise plastic intercooler pipe of claim 11, wherein the soundproof core layer comprises the thermoplastic etherester elastomer, glass bubbles, and a heat stabilizer.

13. An automobile comprising the low-noise plastic intercooler pipe of claim 11.

* * * * *